(12) United States Patent
Shimizu

(10) Patent No.: US 9,546,265 B2
(45) Date of Patent: Jan. 17, 2017

(54) PLANT DERIVED PLASTIC BLEND AND A METHOD OF MANUFACTURING THE SAME

(71) Applicant: NATIONAL INSTITUTE OF ADVANCED INDUSTRIAL SCIENCE AND TECHNOLOGY, Chiyoda-ku, Tokyo (JP)

(72) Inventor: Hiroshi Shimizu, Tsukuba (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 0 days.

(21) Appl. No.: 14/332,570

(22) Filed: Jul. 16, 2014

(65) Prior Publication Data

US 2014/0329969 A1    Nov. 6, 2014

Related U.S. Application Data

(63) Continuation of application No. PCT/JP2013/050757, filed on Jan. 17, 2013.

(30) Foreign Application Priority Data

Jan. 17, 2012  (JP) ................................. 2012-007315
Sep. 4, 2012   (JP) ................................. 2012-193859

(51) Int. Cl.
   *C08L 23/06*  (2006.01)
   *C08L 37/00*  (2006.01)
   (Continued)

(52) U.S. Cl.
   CPC ............. *C08L 23/06* (2013.01); *C08J 3/005* (2013.01); *C08L 23/0815* (2013.01); *C08L 67/04* (2013.01);
   (Continued)

(58) Field of Classification Search
   USPC ......................................................... 525/190
   See application file for complete search history.

(56) References Cited

U.S. PATENT DOCUMENTS 5,216,050 A * 6/1993 Sinclair ........................ 524/108
7,381,772 B2 * 6/2008 Flexman et al. .............. 525/163
(Continued)

FOREIGN PATENT DOCUMENTS

CN      101142282 A    3/2008
JP      2005-313608 A  11/2005
(Continued)

OTHER PUBLICATIONS

Voevodina, et al, "Bio-based polymers," www.plastice.org, 8 pages (undated).*

(Continued)

*Primary Examiner* — Fred M Teskin
(74) *Attorney, Agent, or Firm* — Hauptman Ham, LLP

(57) ABSTRACT

Provided are a plant derived plastic blend and a manufacturing method thereof in which high density polyethylene and polylactic acid are microscopically mixed to improve the mechanical properties of the plant derived plastic blend. The plant derived plastic blend comprises 10 wt % or more and 90 wt % or less of a plant derived polyethylene and 10 wt % or more and 90 wt % or less of a plant derived polylactic acid to achieve a total of 100 wt %, and further contains 1 wt % or more and 20 wt % or less of a compatibilizing agent. The manufacturing method of the plant derived plastic blend is carried out in a cylinder by applying a shear flow field and a stretching field and melt-kneading raw material containing the plant derived polyethylene, the polylactic acid and the compatibilizing agent.

6 Claims, 17 Drawing Sheets

(51) Int. Cl.
| | |
|---|---|
| *C08L 67/04* | (2006.01) |
| *C08J 3/00* | (2006.01) |
| *B29C 47/38* | (2006.01) |
| *C08L 23/08* | (2006.01) |
| *C08L 101/16* | (2006.01) |
| *B29D 22/00* | (2006.01) |

(52) U.S. Cl.
CPC .......... *C08L 101/16* (2013.01); *C08J 2300/16* (2013.01); *C08J 2323/06* (2013.01); *C08J 2367/04* (2013.01); *C08L 2207/06* (2013.01)

(56) References Cited

U.S. PATENT DOCUMENTS

| | | |
|---|---|---|
| 2008/0071038 A1 | 3/2008 | Ido |
| 2011/0282006 A1 | 11/2011 | Shimizu et al. |

FOREIGN PATENT DOCUMENTS

| | | |
|---|---|---|
| JP | 2006-077063 A | 3/2006 |
| JP | 2008-038142 A | 2/2008 |
| JP | 2008-111043 A | 5/2008 |
| JP | 2010-058329 A | 3/2010 |
| JP | 2010-162748 A | 7/2010 |
| JP | 2010-222482 A | 10/2010 |
| JP | 2011-021067 A | 2/2011 |
| JP | 2011-132525 A | 7/2011 |
| JP | 2011-201980 A | 10/2011 |
| JP | 2011214163 A | 10/2011 |
| WO | 2010/061872 A1 | 6/2010 |

OTHER PUBLICATIONS

Online translation of JP 2010-058329A, published Mar. 2010.*
Online translation of JP 2011-021067A, published Feb. 2011.*
Online translation of JP 2011-132525A, published Jul. 2011.*
Moura, et al, "Preparation of Biodegradable Materials by Reactive Extrusion," Materials Science Forum vols. 587-588 (2008), 520-524.*
International Search Report issued in PCT/JP2013/050757 dated Apr. 16, 2013.
International Preliminary Report on Patentability issued in PCT/JP2013/050757 dated Apr. 16, 2013.
International Preliminary Report on Patentability dated on Jul. 22, 2014 corresponding to PCT/JP2013/050757.
Chinese Office Action dated Nov. 2, 2015 corresponding to Chinese Application No. CN201380005661.7.
Extended European Search Report issued on Mar. 30, 2016 for the counter European application No. 13738399.8.
An Office Action issued on Jun. 13, 2016 from SIPO for the corresponding Chinese Patent Application No. 201380005661.7.
Office Action mailed May 31, 2016 from Japanese Patent Office in connection with the corresponding Japanese Application No. 2013-554325.
Office Action mailed on Sep. 20, 2016 from JPO for Japanese Application No. 2013-554325. Total 11 pages including English translation.
Communication pursuant to Article 94(3) EPC issued on Nov. 7, 2016 from European Patent Office for European Family Application No. 13 738 399.8. Total 3 pages.

* cited by examiner

PLANT DERIVED PLASTIC BLEND AND A METHOD OF MANUFACTURING THE SAME

CROSS REFERENCE TO RELATED APPLICATIONS

This application is based upon and claims the benefit of priority from the prior Japanese Patent Application No. 2012-007315, filed on Jan. 17, 2012, the prior Japanese Patent Application No. 2012-193859, filed on Sep. 4, 2012, and PCT Application No. PCT/JP2013/050757, filed on Jan. 17, 2013, the entire contents of which are incorporated herein by reference.

FIELD

The present invention is related to plastic blends and a method of manufacturing the same. In particular, the present invention is related to a plant derived plastic blend using a plant derived raw material and a method for producing the same.

BACKGROUND

It is believed that reducing dependence on fossil resources is one of the most effective solutions as a measure against the problem of global warming. Beginning with the use of biomass fuel, the active use of plant derived materials is believed to be an effective means for controlling the emission of $CO_2$. In such a trend, the use of plant derived plastic is a very important key technology in helping to reduce dependence on fossil resources. Conventionally, polylactic acid (PLLA) has been a representative example of plant derived plastics, however, today products derived from plants are beginning to be produced using nylon and polyethylene (PE) which is a general purpose plastics and the use of petroleum derived PE of is gradually being replaced.

In the case where PE materials are used to achieve better mechanical properties, it is necessary to use high-density PE (HDPE) instead of low density PE (LDPE). However, even in PE derived from petroleum, it is not possible to simply replace LDPE with HDPE to achieve a less noticeable performance improvement. Since the elastic modulus of PE is low, an increase in performance is expected by blending with high modulus plastic such as PLLA in order to achieve high elastic modulus. However, in a convention mixing process, since there is no technique for a blend which mixes the PLLA and HDPE microscopically, modification of HDPE and the like did not progress. This situation is the same today where it is possible to use plant derived PE. See Japanese Laid Open Patent No. 2008-038142.

SUMMARY

Therefore, in order to actively using plant derived PE and further accelerate the substitution from petroleum derived PE, the development of manufacturing technology of plant derived plastic blends which have microscopically mixed HDPE and PLLA is essential.

An aim of the present invention is to provide a plant derived plastic blend in which HDPE and PLLA are mixed microscopically with improved mechanical properties and to provide a manufacturing method thereof.

According to an embodiment of the present invention, a plant derived plastic blend is provided including 10 wt % or more and 90 wt % or less of a plant derived polyethylene and 10 wt % or more and 90 wt % or less of a plant derived polylactic acid to achieve a total of 100 wt %, and further containing 1 wt % or more and 20 wt % or less of a compatibilizing agent.

In the plant derived plastic blend, a proportion being 1 µm or less of a domain size of the plant derived polylactic acid may be 60% in the case where the plant derived polyethylene is a matrix, and a proportion being 1 µm or less of a domain size of the plant derived polyethylene may be 40% in the case where the plant derived polylactic acid is a matrix.

In the plant derived plastic blend, the compatibilizing agent may be an epoxy group containing resin, contain an epoxy group, may be a copolymer containing an olefinic compound structure, and is preferred to be a an epoxy group-containing ethylene copolymer consisting of (a) 60 wt % or more and 99 wt % or less of an ethylene unit, (b) 0.1 wt % or more and 30 wt % or less of an unsaturated carboxylic acid glycidyl ester unit or unsaturated glycidyl ether unit, and (c) 0 wt % or more and 40 wt % or less of an ethylene unsaturated ester compound.

In the plant derived plastic blend, the epoxy group containing resin may be an ethylene glycidyl methacrylate methyl acrylate copolymer wherein the contained amount of glycidyl methacrylate is 0.1 wt % or more and 30 wt % or less.

The plant derived plastic blend may have a modulus of elongation of 950 MPa or more and a breaking elongation of 4% or more.

In addition, according to an embodiment of the present invention, a method of manufacturing a plant derived plastic blend is provided including supplying a raw material including a plant derived polyethylene, a plant derived polylactic acid and a compatibilizing agent to a melt-kneading machine installed with an internal feedback type screw capable of shifting a melt-kneaded product of the raw material sent to the screw tip end direction again to a rear end direction, and performing melt-kneading by circulating for a fixed period of time under the following conditions, heating at 180° C. or more and 250° C. or less, the number of rotations of the screw is 200 rpm or more and 3000 rpm or less, and a shear rate is 300 $sec^{-1}$ or more and 4500 $sec^{-1}$ or less.

In the method of manufacturing a plant derived plastic blend, the raw material may be passed through a hole arranged on the screw and may be shifted to the rear tip end direction.

In the method of manufacturing a plant derived plastic blend, 10 wt % or more and 90 wt % or less of a plant derived polyethylene and 10 wt % or more and 90 wt % or less of a plant derived polylactic acid may be contained to achieve a total of 100 wt %, and kneading may be performed after further adding 1 wt % or more and 20 wt % or less of a compatibilizing agent.

In addition, according to an embodiment of the present invention, a container is provided including the plant derived plastic blend according to any one described above.

In addition, according to an embodiment of the present invention, a cosmetic container is provided including the plant derived plastic blend according to any one described above.

In addition, according to an embodiment of the present invention, a packaging container is provided including the plant derived plastic blend according to any one described above.

In addition, according to an embodiment of the present invention, automotive parts are provided including the plant derived plastic blend according to any one described above.

REFERENCE SIGNS LIST

Figure 1:
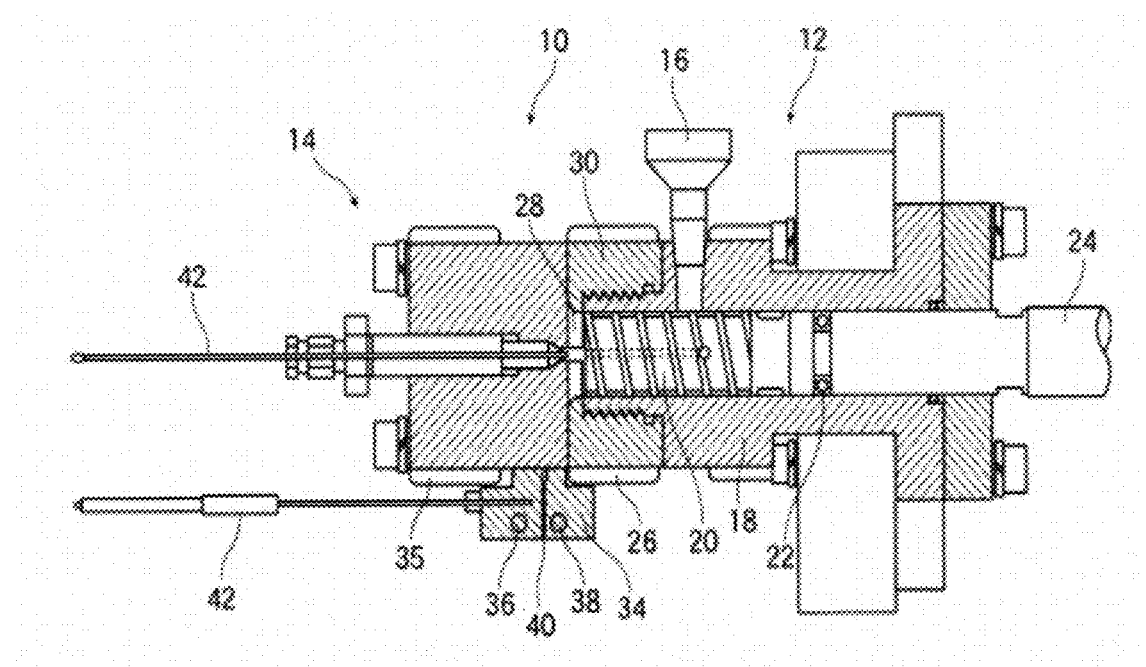
FIG. 1 is a schematic diagram showing a melt-kneaded product manufacturing apparatus related to an embodiment of the present invention.

10: trace-type high-shear molding machine, 12: melt-kneading part, 14: molding part, 16: material input unit, 18: cylinder, 20: feedback type screw, 18: cylinder, 22: bearing: 24 shaft, 26: Heater, 28: seal member (seal surface), 29: tip end surface of a screw, 32: gap between the tip end surface of the screw, 35: extrusion unit heater, 36: T-die tip end heater, 38: T-die rear end heater, 40: discharge opening, 42: thermocouple, 44: screw hole, 46: internal feedback type structure, 48: screw rear stage, 50: screw front stage

DESCRIPTION OF EMBODIMENTS

The plant derived plastic blend and method of manufacturing the same related to the present invention is explained below with reference to the drawings. However, the plant derived plastic blend of the present invention and its method of manufacturing the same should not to be construed as being limited to the description of the embodiments and examples shown below. In the drawings to be referenced in the embodiments and examples of the present embodiment, the same reference numbers are given to parts having similar functions or the same parts and repetitive descriptions thereof are omitted.

In order to solve the technical problems described above, the present invention examined a method of mixing microscopically high density plant derived PE and PLLA. By not only adding a compatibilizing agent but also performing high-shear molding and mixing microscopically high density PE and PLLA, the present inventors found that mechanical properties are significantly improved.

The plant derived plastic blend related to an embodiment of the present invention includes a plant derived high density PE, plant derived PLLA, and a compatibilizing agent. The plant derived plastic blend related to the present embodiment is a plastic blend of microscopically mixed high density PE and PLLA by performing high shear molding of these raw materials.

(Plant Derived High Density Polyethylene)

Plant derived high density polyethylene (plant derived HDPE) related to the present embodiment is a structural component for providing high mechanical properties to a plant derived plastic blend. A known plant derived HDPE can be used as the plant derived HDPE related to the present embodiment and can be purchased commercially. It is preferred that the plant derived plastic blend related to the present embodiment preferably contains 10 wt % or more and 90 wt % or less of plant derived HDPE.

(Plant Derived Polylactic Acid)

Plant derived polylactic acid (plant derived PLLA) related to the present embodiment is a structural component that provides high modulus of elasticity and in particular modulus of elongation to a plant derived plastic blend. A known plant derived PLLA can be used as the plant derived PLLA related to the present embodiment and can be purchased commercially. It is preferred that the plant derived plastic blend related to the present embodiment preferably contains 10 wt % or more and 90 wt % or less of plant derived PLLA.

(Compatibilizing Agent)

In the plant derived plastic blend, a compatibilizing agent related to the present embodiment is a component which compatibilizes plant derived HDPE and plant derived PLLA. The compatibilizing agent related to the present embodiment is an epoxy group containing resin, contains an epoxy group, is a copolymer containing an olefinic compound structure, and is preferred to be a an epoxy group-containing ethylene copolymer consisting of (a) 60 wt % or more and 99 wt % or less of an ethylene unit, (b) 0.1 wt % or more and 30 wt % or less of an unsaturated carboxylic acid glycidyl ester unit or unsaturated glycidyl ether unit, and (c) 0 wt % or more and 40 wt % or less of an ethylene unsaturated ester compound. For example, it is possible to use ethylene glycidyl methacrylate methyl acrylate copolymer (E-GMA-MA). As the E-GMA-MA which can be suitably used in the present embodiment, for example, BF7L or BF2C, BF20C manufactured by Sumitomo Chemical Co., Ltd are available. The E-GMA-MA related to the present embodiment is preferred to contain 0.1 wt % or more and 30 wt % or less of glycidyl methacrylate. The plant derived plastic blend related to the present embodiment is preferred to contain 1 wt % or more and 20 wt % or less of E-GMA-MA with the total of the plant derived HDPE and plant derived PLLA making 100 mass. By containing the E-GMA-MA in this range, it is possible to suitably disperse the plant derived HDPE and plant derived PLLA and demonstrate superior mechanical properties in the plant derived plastic blend.

Because the plant derived plastic blend related to the present embodiment has a structure in which plant derived HDPE and plant derived PLLA are mixed microscopically, it has a modulus of elongation of 950 MPa or more and a breaking elongation of 4% or more. In addition, in the case where the plant derived plastic blend related to the present embodiment has a plant derived polyethylene matrix, the proportion being 1 μm or less of the domain size of the plant derived polylactic acid is 60% or more, and in the case where the matrix is a plant derived polylactic acid, the proportion being 1 μm or less of the domain size of the plant derived polyethylene is 40% or more.

The plant derived plastic blend related to the present embodiment with improved mechanical properties can be used for example for containers such as cosmetic containers or packaging containers and for automotive parts. Containers such as cosmetic containers or packaging containers and automotive parts can use alternative made of plant derived materials and be provided with excellent mechanical properties by including the plant derived plastic blend related to the present exemplary embodiment.

(Method for Manufacturing a Plant Derived Plastic Blend)

As described above, in the plant derived plastic blend related to the present invention, microscopic mixing of HDPE and PLLA which was conventionally difficult is realized. This microscopic mixing requires not only the addition of a compatibilizing agent but also performing high-shear molding. High shear molding related to the present embodiment is explained below.

In the present embodiment, using a trace-type high-shear molding machine installed with an internal feedback type screw, the screw is rotated with a rotation frequency of 200 rpm or more and 3000 rpm or less, and by adding plant derived HDPE, plant derived PLLA and compatibilizing agent and melt-kneading, one polymer component is formed into a matrix, and a plant derived plastic blend extrudate in which the dispersed phase size of the other polymer component is controlled microscopically is produced. Furthermore, the "extrudate" in the present invention may be an extrudate merely having state a kneading state (referred to as "kneaded product") and may be an extrudate having a sheet shape by molding (referred to as "molded" product).

In order to knead the plant derived high density PE, plant derived PLLA and compatibilizing agent mixture, it is possible to use a method by dry blending to mix the mixture beforehand in a granule state. Prior to dry blending, for example, the plant derived PLLA may be dried for 24 hours in a vacuum at 80° C., and the plant derived HDPE and compatibilizing agent are preferably dried for 24 hours in a vacuum at 45° C.

Plant derived PLLA and plant derived HDPE are incompatible, and in order to obtain a blend thereof, usually both are mixed using a two-axis melt-kneader at 170° C. or more and 250° C. or less near melting point.

When both are in a two-axis melt-kneading machine at 170° C. or more and 250° C. or less near melting point, in the case where the internal structure of their extrudate forms a matrix of one component, due to the dispersed phase size of the other component becoming coarse to a level of a few microns to several tens of micrometers resulting in a so called phase separation structure and thereby, the result is that it is not possible to demonstrate good mechanical performance as a characteristic of the obtained melt-kneaded product.

An apparatus which can provide a stretching field as well as a shear flow field is preferred as the apparatus used in the melt-kneading process for manufacturing a plant derived plastic blend of the present embodiment. For example, a shear flow field is applied between a screw and a cylinder and a stretching field is applied when passing through screw feedback hole 44 in FIG. 3. Any device that can apply such fields may be used. As a result of keen research and development, the present inventors found that it is possible to obtain a new plant derived plastic blend dispersed with a uniform and dense microscopic plant derived PLLA phase to a plant derived HDPE matrix phase which could not be obtained conventionally by melt-kneading a blend comprised from a plant derived PLLA, plant derived HDPE and added with a compatibilizing agent using a trace-type high-shear molding machine installed with an internal feedback type screw that can shift again a melt-kneaded product of a raw material sent in the tip end direction of the screw to the rear direction instead of a usual two-axis type kneader under the following conditions, the rotational speed of the screw is 200 rpm or more and 3000 rpm or less, the shear rate 300 $\sec^{-1}$ or more and 4500 $\sec^{-1}$ or less, and a heating temperature of 180° C. or more and 250° C. or less.

Even in case of using a trace-type high shear molding machine installed with an internal feedback type screw, it is necessary to sufficiently blend the subject to be melt-kneaded such as the plant derived PLLA, plant derived HDPE further added with a compatibilizing agent before being supplied to the high-shear molding machine. This means that by dry blending after adjusting in advance a non-soluble resin to each composition by weight and eliminating unevenness, a uniform state as much as possible is achieved. In the case of the present invention, a device large enough to carry out industrial manufacturing is not used, the amount of the incompatible resin used increases in the case of actually performing manufacture on the scale for performing industrial manufacture. In this case, it is necessary perform supply by dry blending after adjusting in advance a non-soluble resin to each composition by weight and eliminating unevenness. Although dry blending is adopted in the present embodiment, it is necessary to adopt a more sophisticated blending method.

The trace-type high-shear molding machine installed with an internal feedback type screw fabricated by the present inventors is shown in FIG. 1. This trace-type high-shear molding machine itself is the same as the trace-type high-shear molding machine introduced in Japanese Laid Open Patent No. 2005-313608.

In FIG. 1, the trace-type high-shear molding machine 10 includes a melt-kneading section 12 and a molding part 14. Molding part 14 has an extrude mold part or an injection mold part. Melt-kneading section 12 is arranged with a material supply part 16, a cylinder 18, a feedback screw 20 mounted in the cylinder 18, and a shaft 24 which is connected via a bearing 22 to the cylinder 18. Cylinder 18 is arranged with a heater 26 for melting a resin in the cylinder 18.

Figure 2:
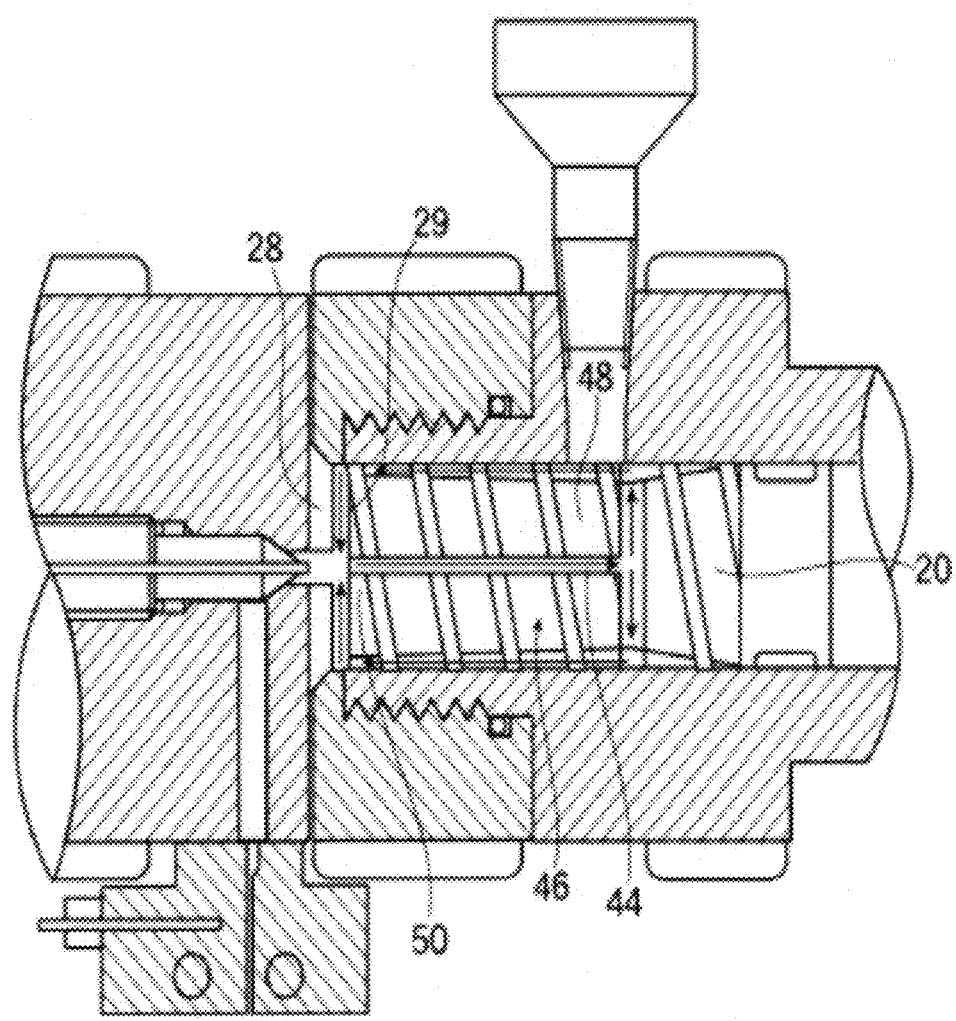
FIG. 2 is a schematic diagram showing a melt-kneaded product manufacturing apparatus related to an embodiment of the present invention.
Figure 3:
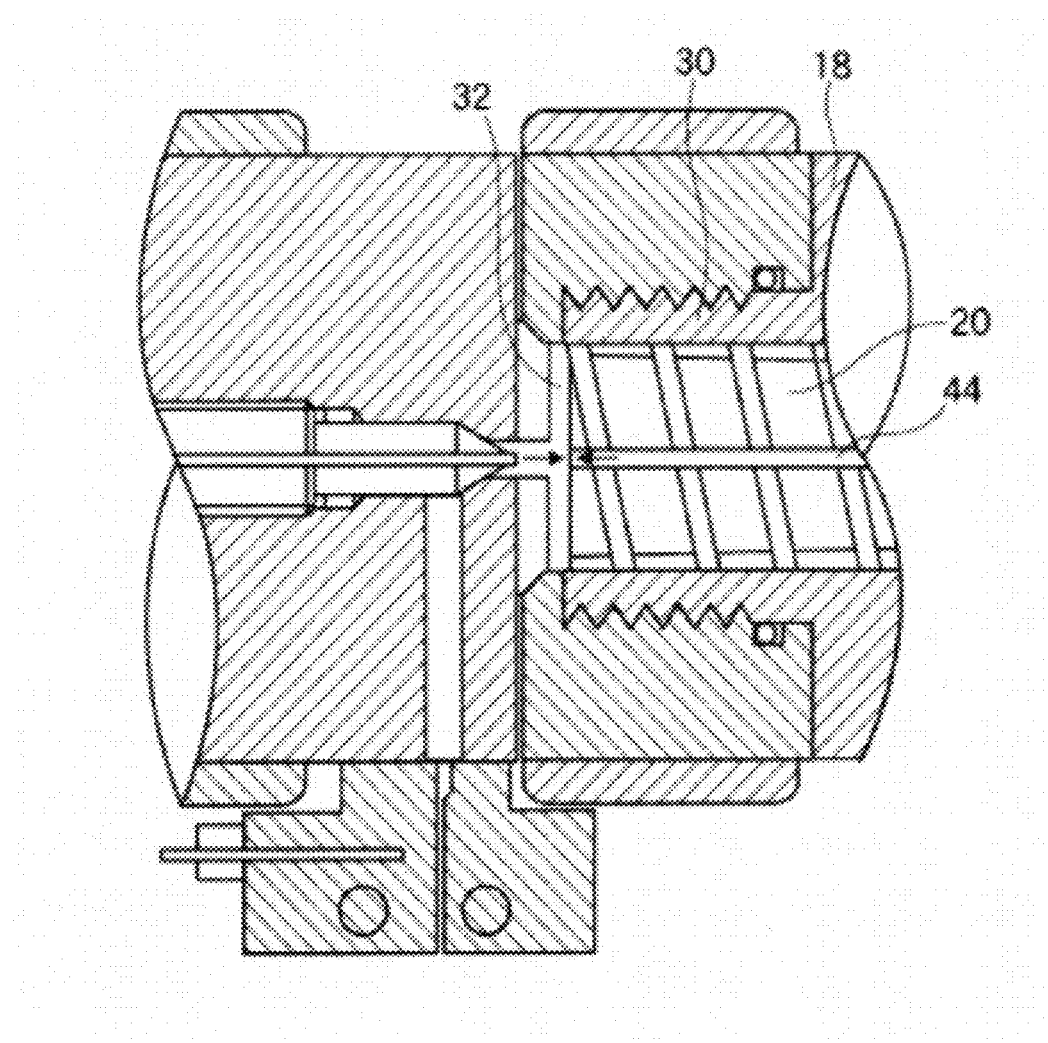
FIG. 3 is a schematic diagram showing a melt-kneaded product manufacturing apparatus related to an embodiment of the present invention.

The cylinder 18 is arranged with a seal 28 for sealing between the molding part 14 and the cylinder 18 and is provided at the end opposite the shaft 24. The cylinder 18, as is shown in FIGS. 2 and 3, is arranged with an adjustment means 30 for adjusting a gap 32 provided between a tip end surface 29 of the screw 20 and seal surface (referred to as "seal surface 28") of a seal component 28 facing the tip end surface 29, on the rear end side of the screw. Gap 32 can be adjusted in the range of 0.5 mm or more and 5 mm or less.

The extrusion molding part which is molding part 14 includes an extrusion unit heater 35 and a T-die 34 for manufacturing a film. T-die 34 has a T-die front end unit heater 36 and T-die rear end unit heater 38. A film which is extracted passes through a discharge opening 40 which is formed between the T-die front end unit heater 36 and the T-die rear end unit heater 38. A thermocouple 42 is attached to the extrusion molding part and the T-die front end unit heater 36 and temperature measurement is performed. The measurement results are sent to a control device (not shown in the diagram) and the temperature of the melt-kneading part 12 and the T-die is adjusted.

The screw 20 has a hole 44 with an inner diameter of 1 mm or more and 5 mm or less and preferably about 2 mm or more and 3 mm or less, the number of rotations of the screw is 200 rpm or more and 3000 rpm or less, and the shear rate is 300 sec$^{-1}$ or more and 4500 sec$^{-1}$ or less. Although the temperature within the cylinder 18 varies depending on the melt-kneading resin, as a guide the temperature is set to room temperature, or is set higher than the glass transition point in the case of an amorphous resin, or is set higher than melting point in the case of crystalline resin. A raw material passes through a hole 44 provided on the screw 20 and is shifted to the screw rear end direction.

Screw 20 is provided with a structure in which at least two types of incompatible blended resins are sufficiently melt-kneaded within the screw 20.

FIG. 3 shows the internal feedback structure 46 of a resin in the feedback type screw. In the internal feedback type structure 46, a mixed resin that is inserted from a screw rear stage 48 is sufficiently kneaded while feeding to the screw front stage 50 by using screw 20, the kneaded resin is trapped in the gap 32 between the tip end surface 29 and the seal surface which faces the tip end surface, the kneaded resin is inserted into the hole 44 arranged in the longitudinal direction at approximately the center of the screw 20 and then is returned again to the rear stage of the screw 20.

The kneading time in the internal feedback structure 46 can be arbitrarily changed according to the time for circulating the internal feedback structure 46. The degree of kneading is adjusted by varying the gap 32 between the tip end surface of the screw 20 and the seal surface 28 facing the tip end surface and the inner diameter of the hole 44 of the screw 20.

Although the degree of kneading becomes higher the more narrow the gap 32, and higher the smaller the inner diameter of the hole 44 of the screw 20, it is necessary to optimize the gap 32 and the inner diameter of the hole 44 of the screw 20 in consideration of viscosity etc. of the resin. The mixing time of the resin in cylinder 18 is 1 minute or more and 10 minutes or less.

As explained above, according to the method of manufacturing the plant derived plastic blend related to the present embodiment, it is possible to perform melt-kneading by applying a high shear field in order to not only induce a reaction at the interface of a blend by adding a compatibilizing agent to a plant derived high density PE and plant derived PLLA but also to make the reaction more efficient. In addition, in the case of forming a matrix of one polymer component by melt-kneading, a plant derived plastic blend with a controlled dispersed phase size of the other polymer component is created.

In the case of using a trace-type high-shear molding machine installed with an internal feedback type screw related to the present embodiment, it is important to not only set the specific temperature described above, but also set the rotation speed of screw in the molding machine and the kneading time as mold process conditions.

In the present invention, although the number of screw rotations can be set to 100 rpm or more and 3000 rpm or less and the kneading time between 0.5 minutes or more and 60 minutes or less, it is possible to obtain optimum result by setting the number of screw rotations to 200 rpm or more and 3000 rpm or less and the kneading time to 1 minute or more and 10 minutes or less.

The method according to the present invention is characterized in that at temperatures under the certain conditions described above, high-shear molding is performed by setting the optimum conditions of number of screw rotations and kneading time. In this way, a good result for the first time can be obtained by combining the specific conditions. If any one of the setting conditions such as temperature setting, kneading time and number of screw rotations departs from the conditions described above, it is not possible to obtain satisfactory results.

In the case of using a trace-type high-shear molding machine 10 installed with the internal feedback type screw related to the present embodiment, by varying the gap 32 between the tip end surface 29 of the screw 20 and the seal surface facing the tip end surface in the cylinder 18 to filled with the plant derived plastic blend, and the inner diameter of the hole 44 of the screw 20, it is possible to adjust the shear strength of the flow field or degree of mixing.

Usually, the gap 32 can be set to any value between 1 mm or more and 5 mm or less and at intervals of 0.5 mm, and the inner diameter of the hole 44 of the screw 20 can be similarly set to any value between 1ϕ and 5ϕ at intervals of 0.5ϕ, however, it was possible to obtain the optimum results by setting the gap 32 to 2 mm and the inner diameter of the hole 44 of the screw 20 to 2.5ϕ.

In the present invention, it is preferred that high-shear molding is performed by optimizing the values of the gap between the tip end surface and the seal surface facing the tip end surface of the screw, and the inner diameter of the hole of the screw under the specific temperature described above.

EXAMPLES

The plant derived plastic blend related to the present invention described above will be described in more detail with reference to examples.

Example

In the present example, a plant derived high-density PE (bio-HDPE) (manufactured by Toyota Tsusho, SGE7252) was used. As a plant derived PLLA, a product (PLLA-1) with a weight average molecular weight (Mw) of $1.7 \times 10^5$ g/mol and a D-form content amount of 1.2%, and a product (PLLA-2) with a weight average molecular weight (Mw) of $1.3 \times 10^5$ g/mol and a D-form content amount of 1.2% was used. In addition, E-GMA-MA (manufactured by Sumitomo Chemical Co., Ltd., BF2C) was used as a compatibilizing agent. A mixing ratio of each plant derived plastic blend raw material was plant derived HDPE: plant derived PLLA-1: E-GMA-MA=75:25:5 as Example 1 and 2, 50:50:5 as Example 3 and 4, and 25:75:5 as Example 5 and 6. In addition, the mixing ratio of plant derived HDPE:plant derived PLLA-1:E-GMA-MA=75:25:10 as Example 7 and 8, 50:50:10 as Examples 9 and 10, and 25:75:10 as Example 11 and 12. In addition, the mixing ratio of plant derived HDPE:plant derived PLLA-2:E-GMA-MA=75:25:10 as Example 13 and 14, 50:50:10 as Example 15 and 16, and 25:75:10 as Example 17 and 18. Furthermore, not only was the plant derived PE a high density (0.948 to 0.962 g/cm$^3$) product but almost the same result was obtained using a low density (0.916 to 0.920 g/cm$^3$) product. In addition, almost the same results were obtained for E-GMA-MA of the compatibilizing agent (manufactured by Sumitomo Chemical Co., Ltd.) by using BF7L or BF20C.

Prior to mixing, the plant derived PLLA was dried for 24 hours at 80° C. in a vacuum, and the plant derived HDPE and compatibilizing agent were dried for 24 hours in a vacuum at 45° C. E-GMA-MA in a proportion of 5 wt % or 10 wt % was dry blended with respect to 100 wt % of a blend of the plant derived HDPE and plant derived PLLA in the proportion described above at room temperature. About 5 g of this dry blend was introduced to a trace-type high-shear molding machine (Imoto Seisakusho, HSE3000mini) the gap (gap 32 in FIG. 3) and inner diameter of the hole of the internal feedback type screw (inner diameter of the hole 44 in FIG. 3) were set to 2 mm and 2.5 mm respectively, heat melting at 190° C. to 200° C. was performed, the number of screw rotations was set to 300 rpm (Examples 1, 3, 5, 7, 9, 11, 13, 15 and 17) and 600 rpm (Examples 2, 4, 6, 8, 10, 12, 14, 16 and 18), kneaded for 2 minutes, extracted from a T-die and cooled and solidified by passing through a cooling water tank. The same results were obtained using a fully automatic high-shear molding device (NHSS2-28) manufactured by Niigata Machine Techno Co Ltd. as the melt-kneading apparatus.

At this time, the temperature was controlled so that the resin temperature did not exceed 220° C. using a cooling means for cooling the cylinder in order to reduce shear heating. Using this process it was possible to obtain a plant derived plastic blend with a good surface state.

Comparative Example

An extrudate of a plant derived high density polyethylene (bio-HDPE) only is shown as Comparative Example 1, an extrudate of a plant derived polylactic acid (PLLA-1) is shown as Comparative Examples 2, and an extrudate of a plant derived polylactic acid (PLLA-2) is shown as Comparative Examples 3.

(Structure Observation)

Figure 4:
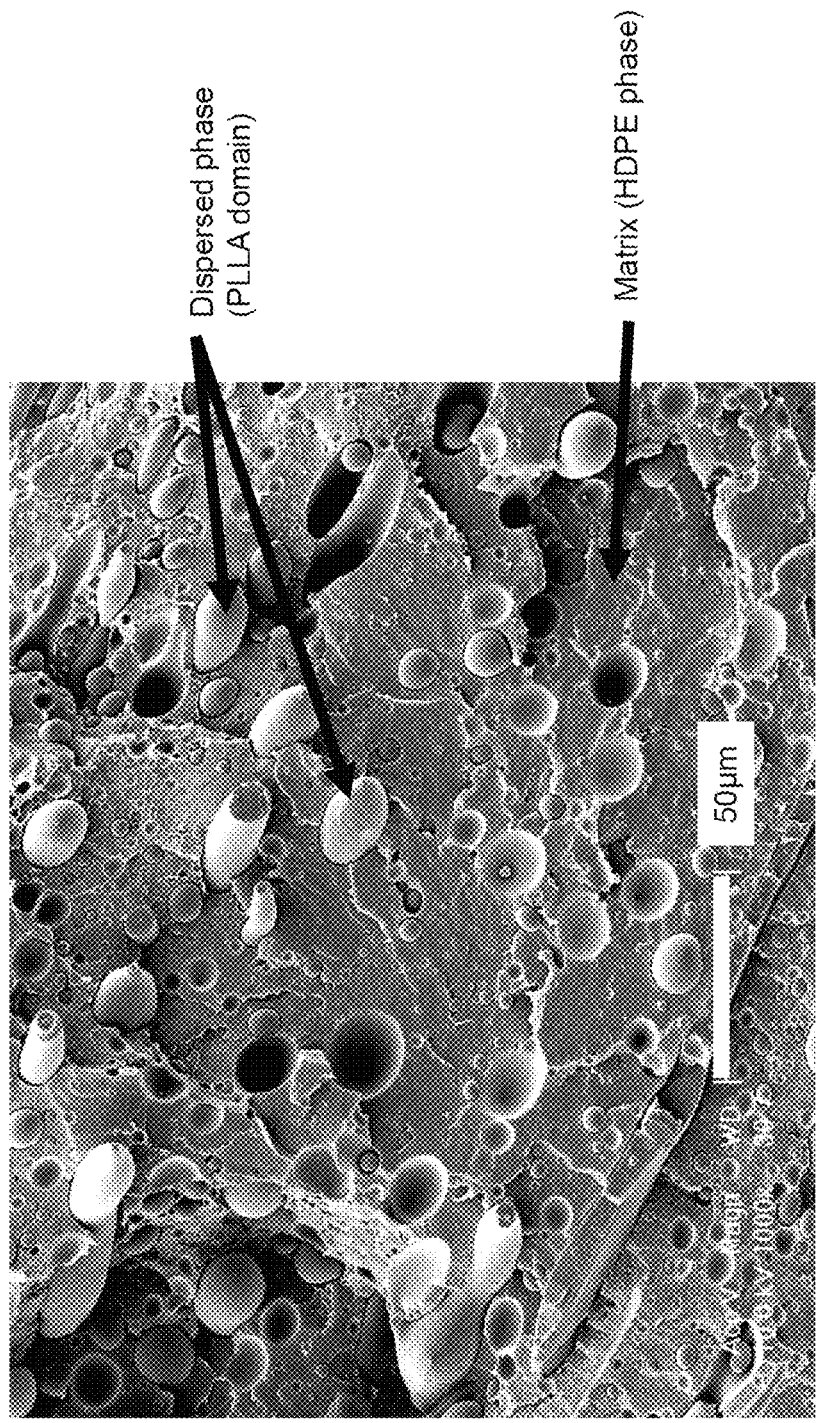
FIG. 4 is a scanning electron microscopy (SEM image) of an extrudate in a comparative example.
Figure 5:
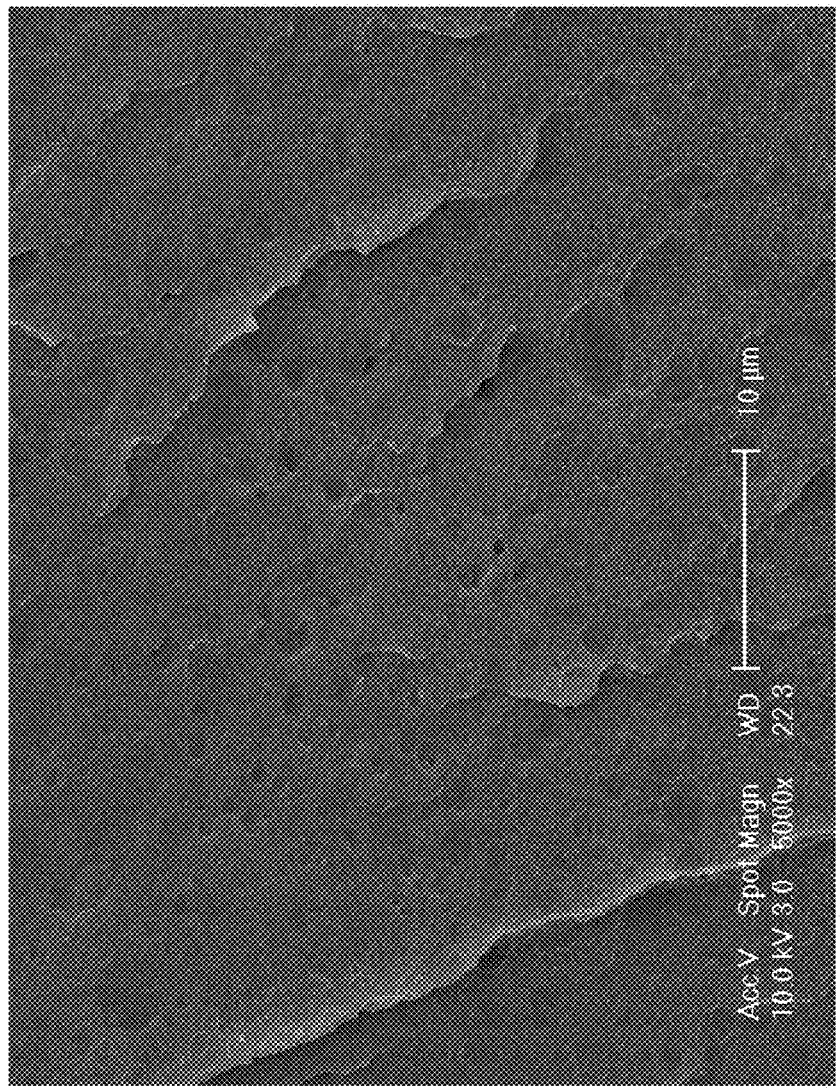
FIG. 5 is a SEM image of the extrudate related to an example of the present invention.

FIG. 4 is a scanning electron microscope image (SEM image) showing the microscopic structure of the extruded product of Comparative Example 4, and FIG. 5 is a SEM image showing the microscopic structure of the extrudate obtained in Example 7. The microscopic structure of the present embodiment was measured at an accelerating voltage of 10 kV using a SEM (field emission type SEM XL-20 manufacture by Philips Co.).

Comparative Example 4 is a bio-HDPE/PLLA-1=75/25 blend sample prepared using a high-shear molding apparatus without the compatibilizing agent with screw rotations of 300 rpm. In FIG. 4, a PLLA domain dispersed in a matrix (bio-HDPE phase) is coarsened to 20 to 30 µm and it was clear that the phases separated. On the other hand, in Example 7, the interface state became very smooth at the level of resolution shown in FIG. 5, and it was clear that miniaturization occurred to the size of 2 µm or less even in places where traces of the PLLA domain was visible.

Figure 6A:
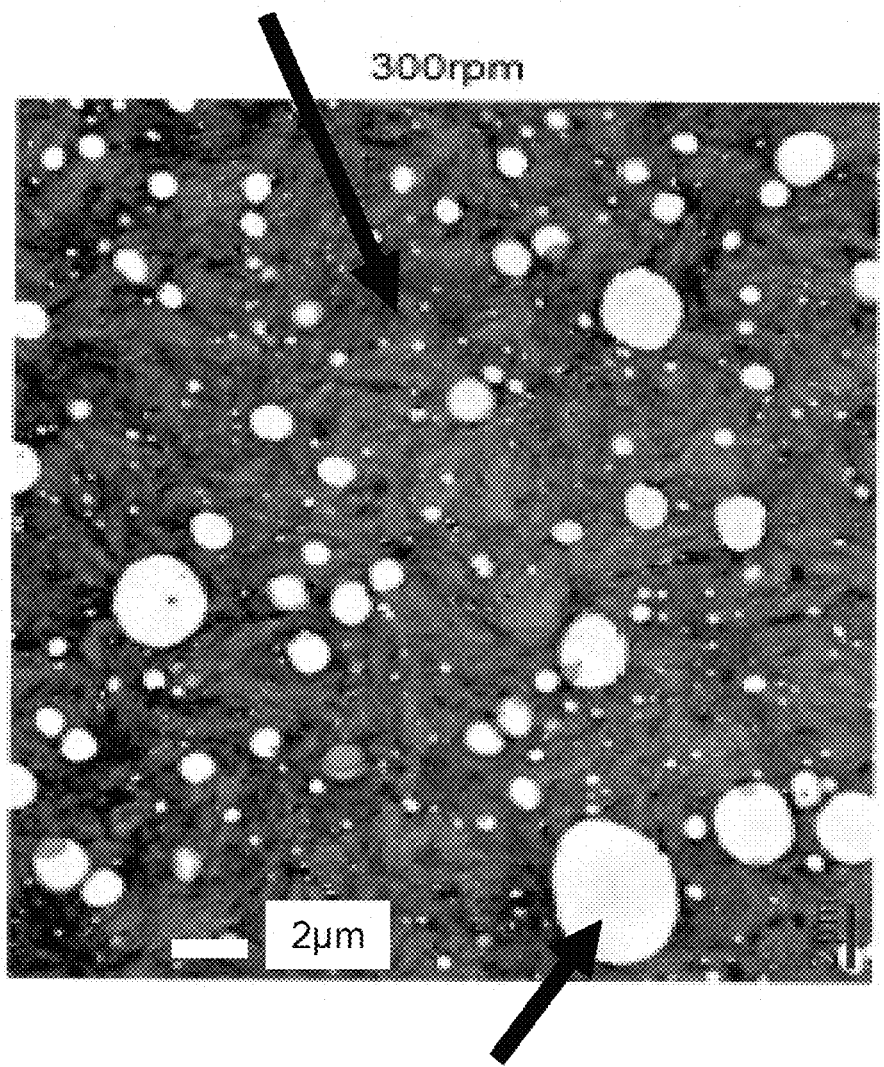
FIG. 6A is a SEM image of the extrudate related to an example of the present invention.
Figure 6B:
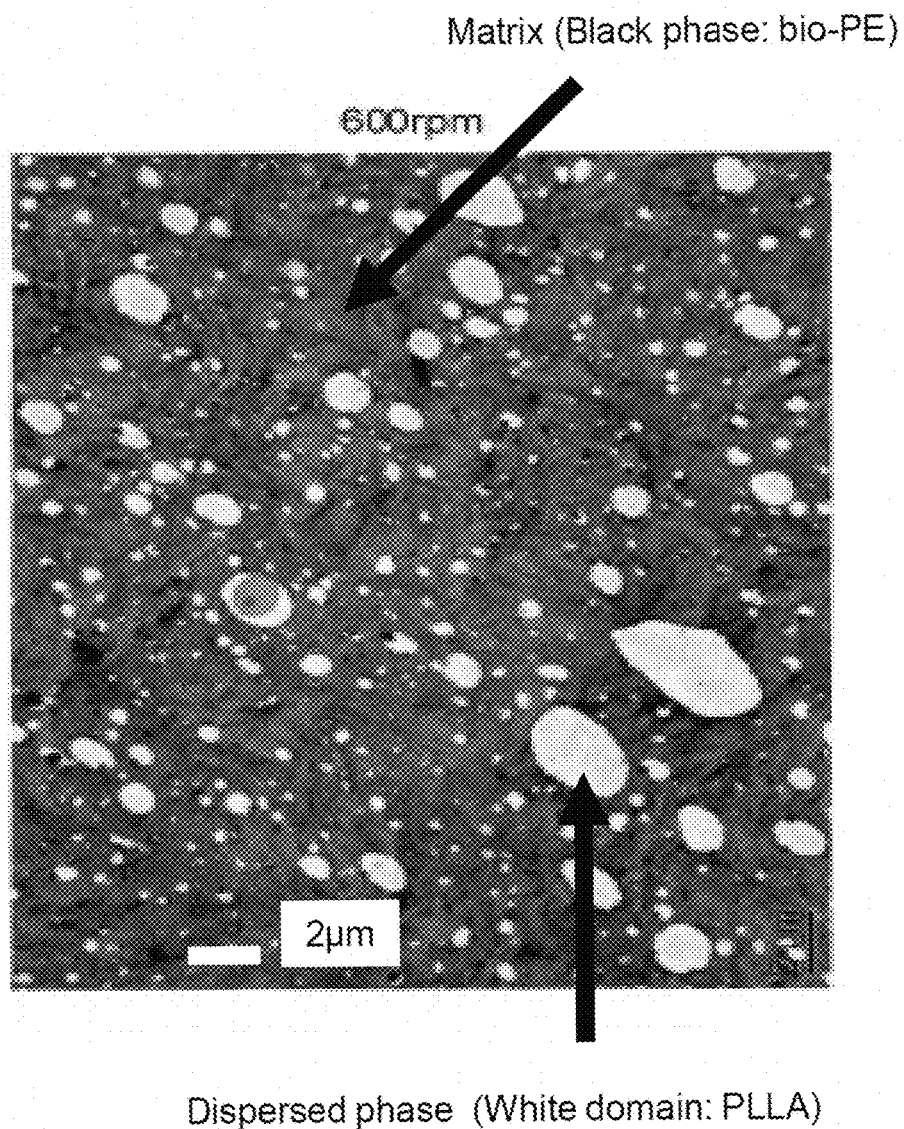
FIG. 6B is a SEM image of the extrudate related to an example of the present invention.
Figure 7A:
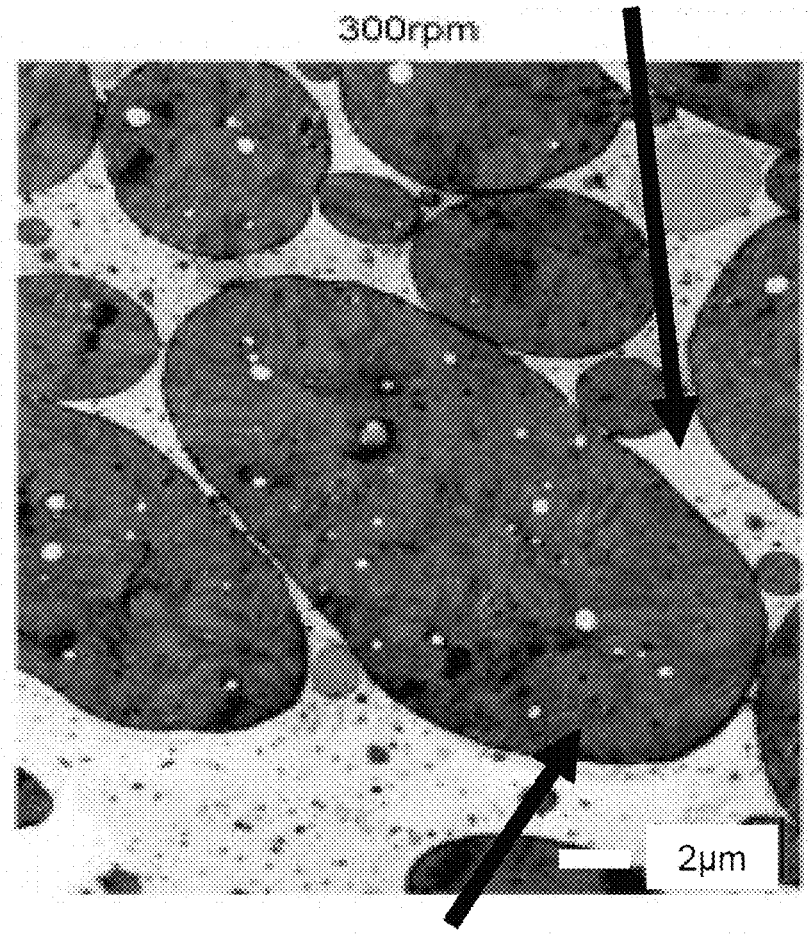
FIG. 7A is a SEM image of the extrudate related to an example of the present invention.
Figure 7B:
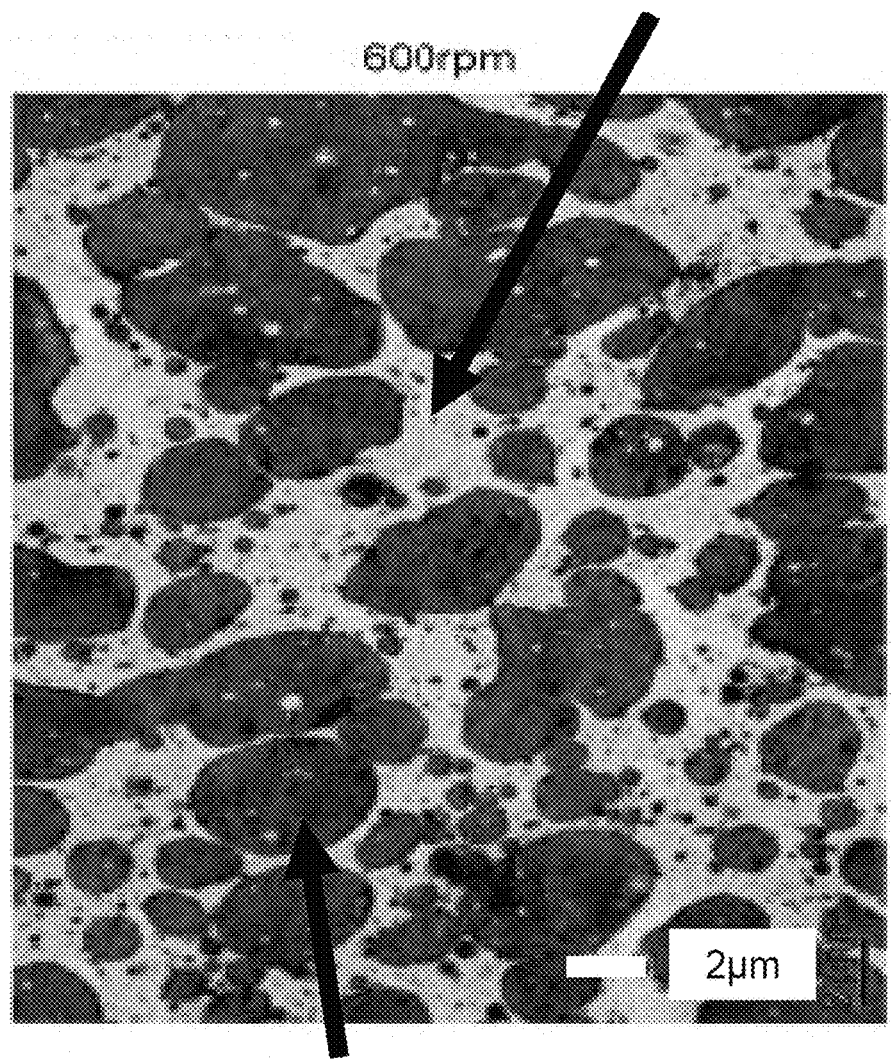
FIG. 7B is a SEM image of the extrudate related to an example of the present invention.
Figure 8:
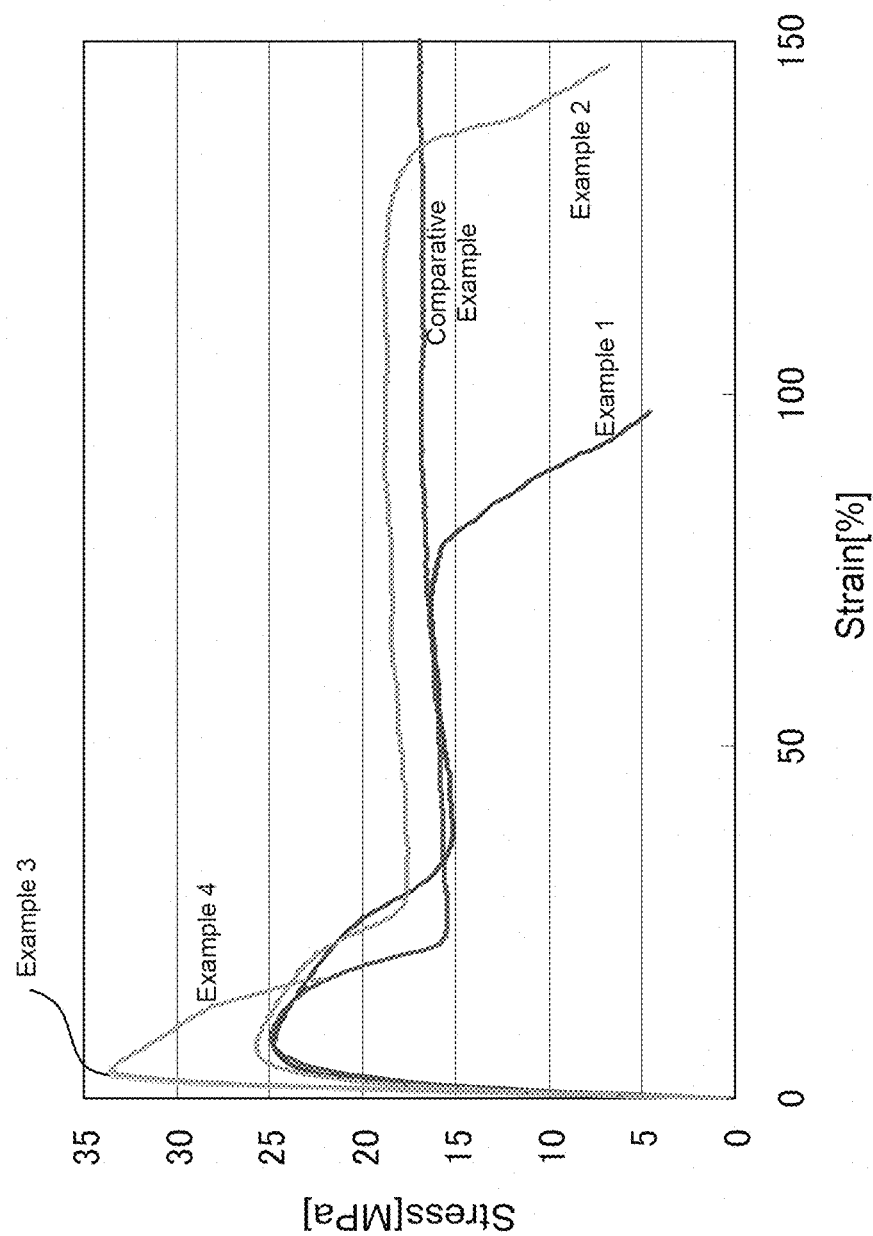
FIG. 8 is a diagram showing stress-strain characteristics related to an example of the present invention.
Figure 9:
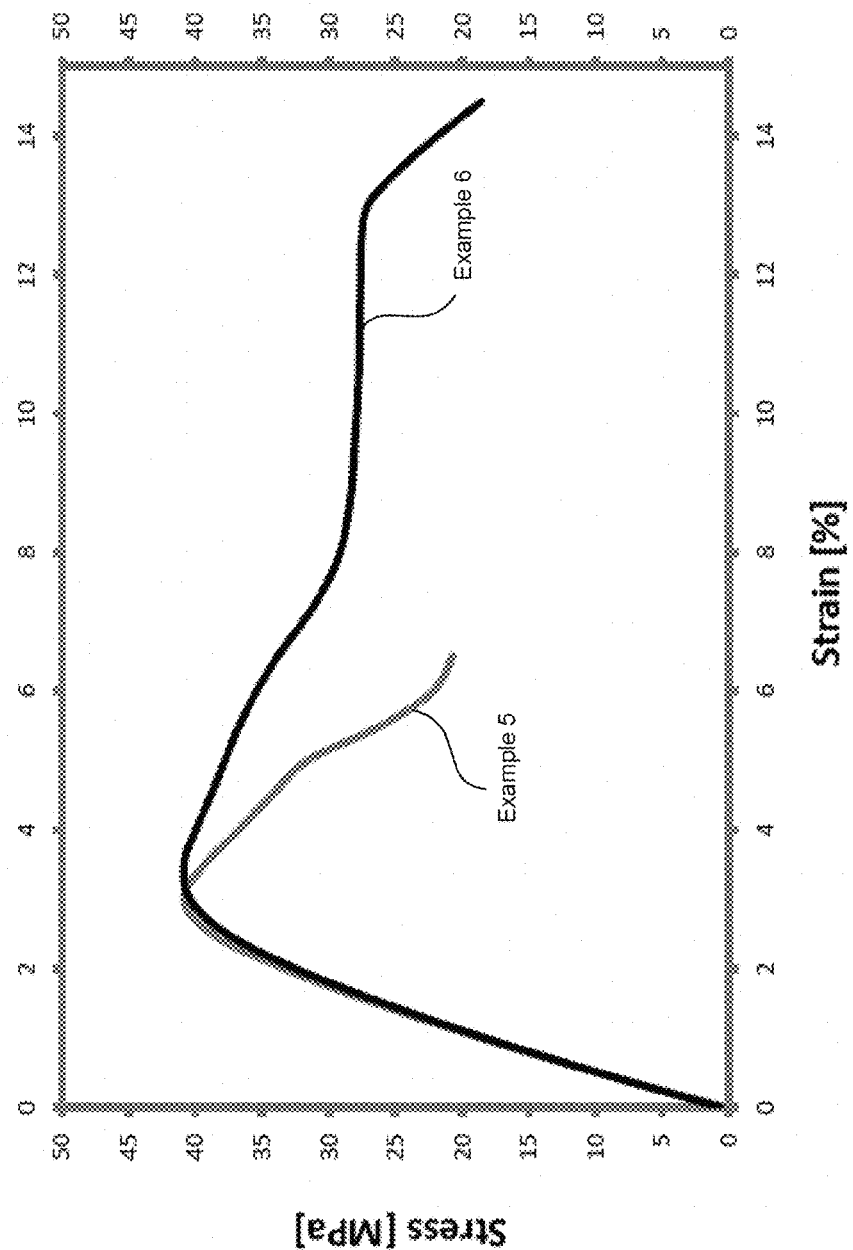
FIG. 9 is a diagram showing stress-strain characteristics related to an example of the present invention.
Figure 10:
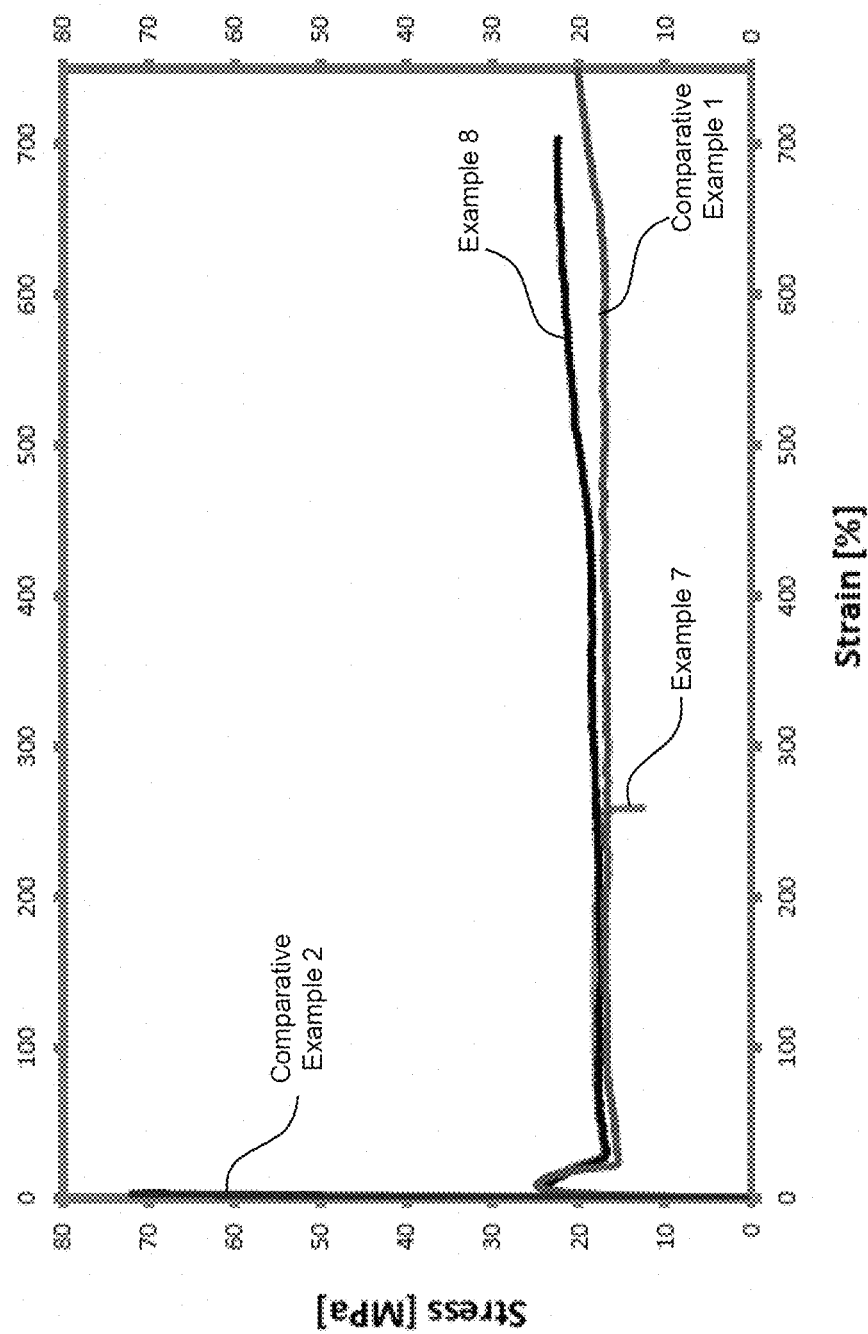
FIG. 10 is a diagram showing stress-strain characteristics related to an example of the present invention.
Figure 11:
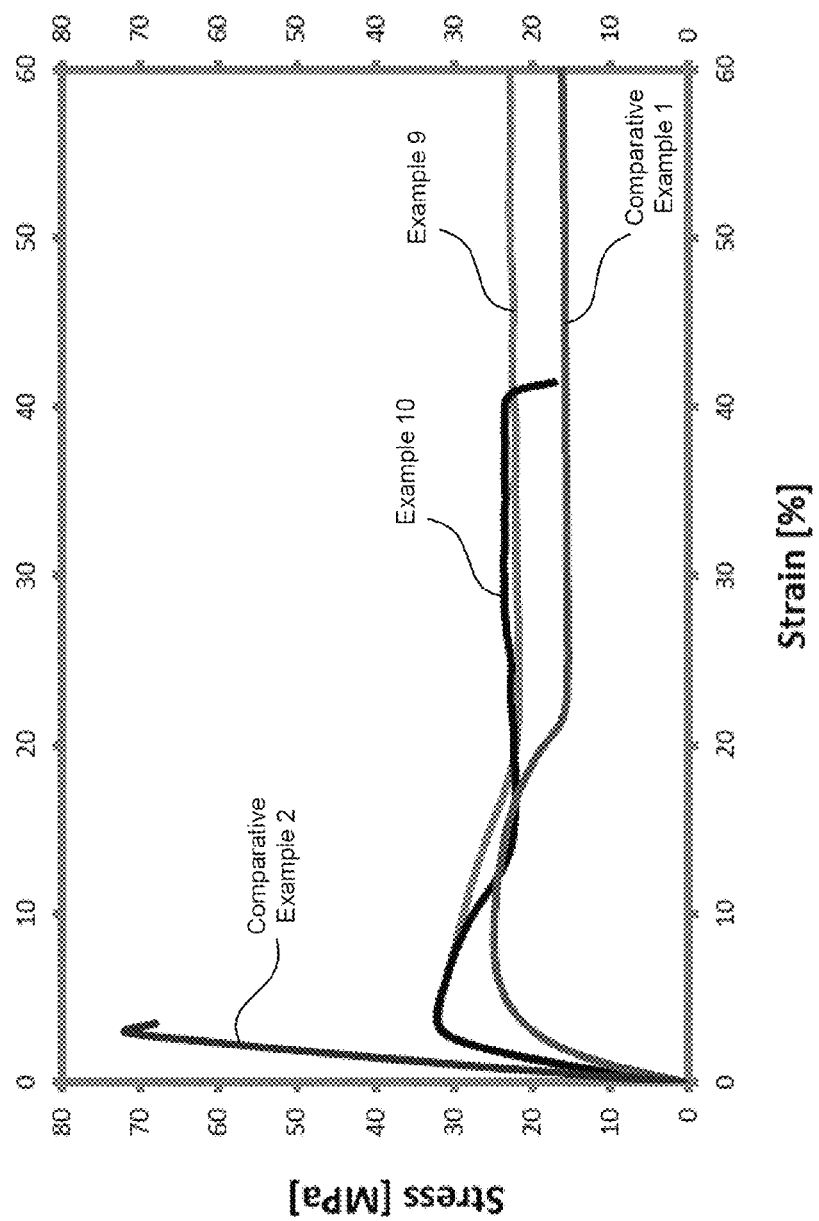
FIG. 11 is a diagram showing stress-strain characteristics related to an example of the present invention.
Figure 12:
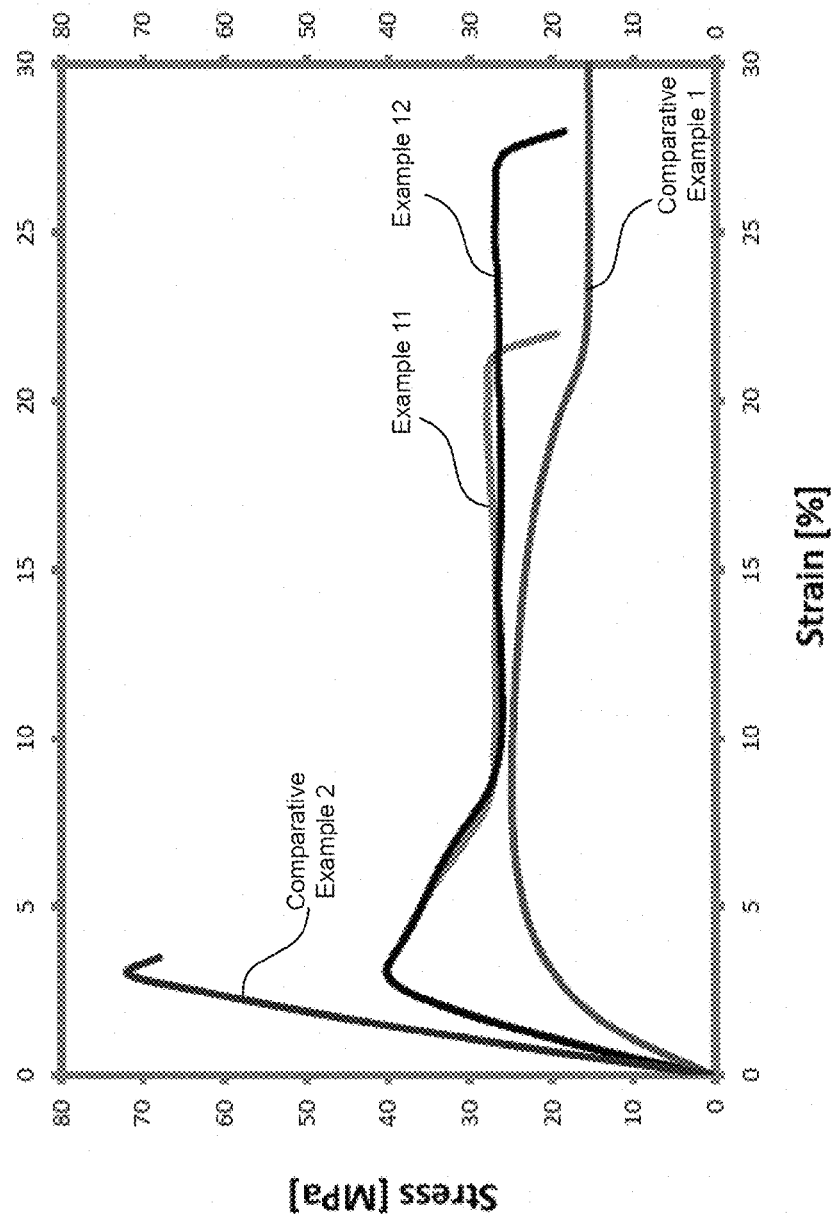
FIG. 12 is a diagram showing stress-strain characteristics related to an example of the present invention.
Figure 13:
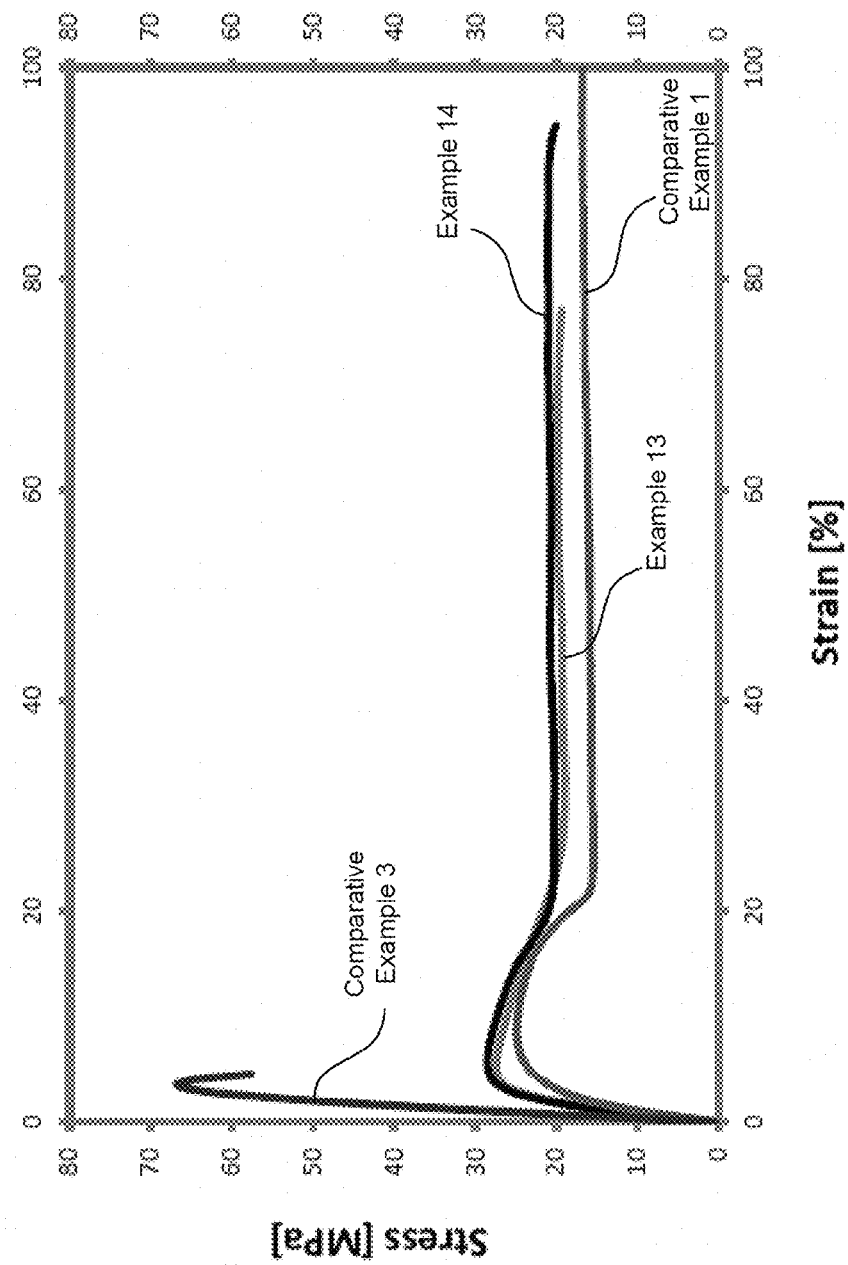
FIG. 13 is a diagram showing stress-strain characteristics related to an example of the present invention.
Figure 14:
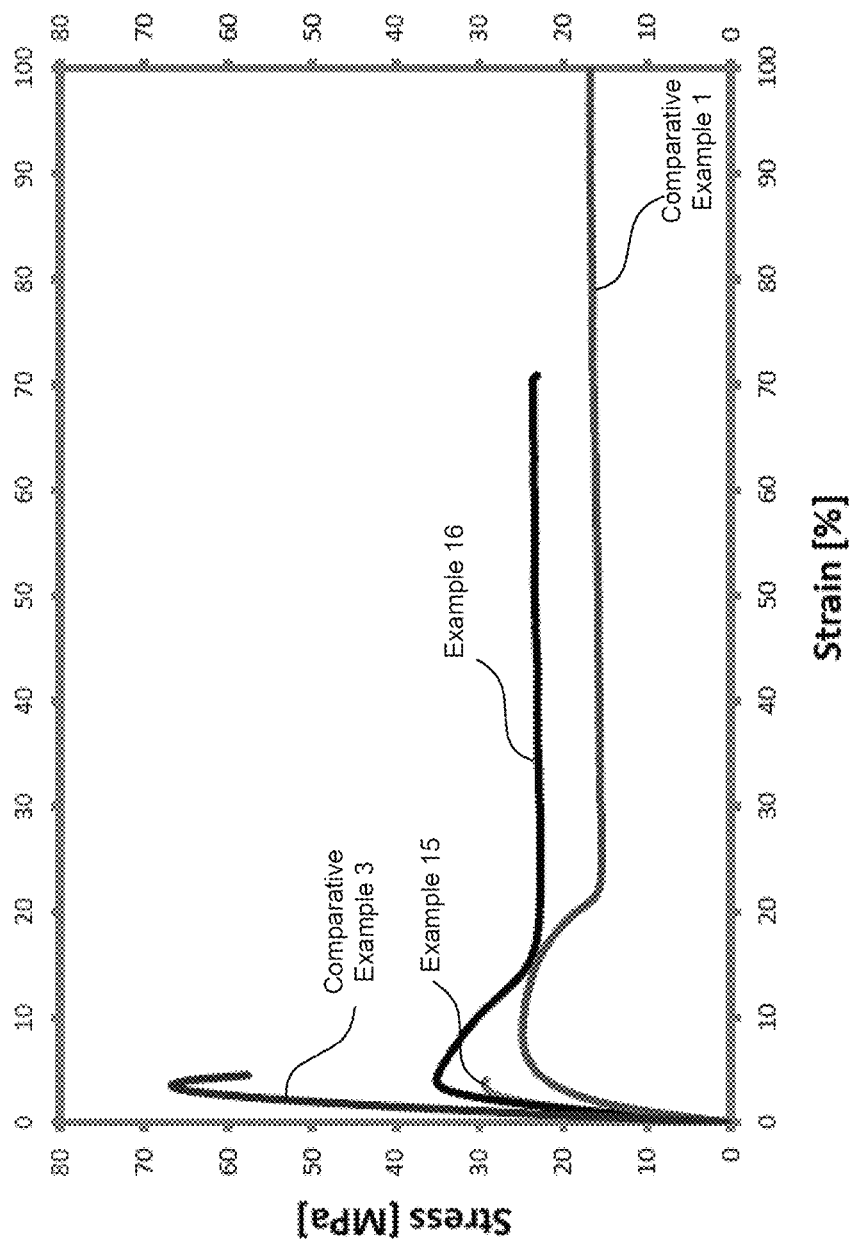
FIG. 14 is a diagram showing stress-strain characteristics related to an example of the present invention.
Figure 15:
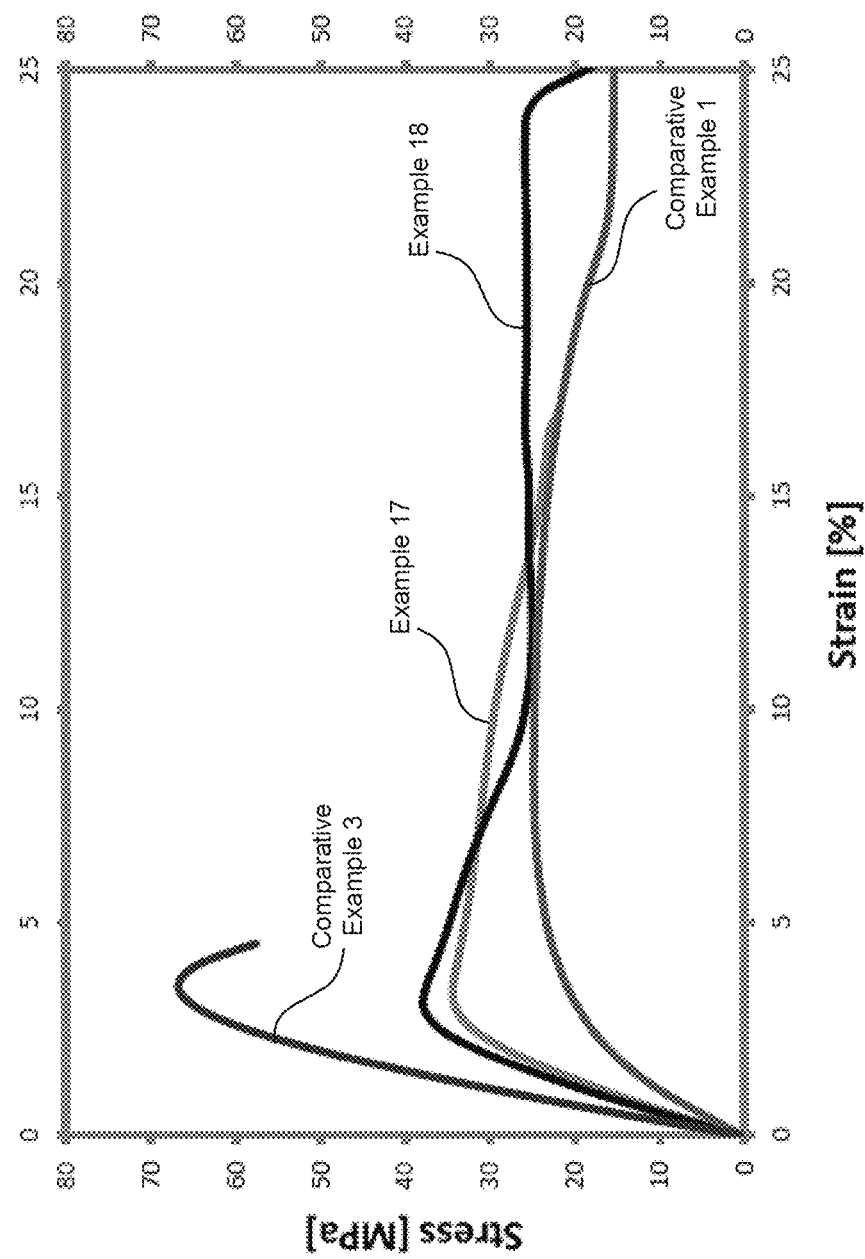
FIG. 15 is a diagram showing stress-strain characteristics related to an example of the present invention.

FIG. 6A, FIG. 6B, FIG. 7A and FIG. 7B are transmission electron microscope images (TEM) images which show the microscopic structure of the extrudate obtained in the present example. FIG. 6A shows the extrudate of Example 1, FIG. 6B shows the extrudate of Example 2. In addition, FIG. 7A shows the extrudate of Example 3, FIG. 7B shows the extrudate of Example 4. The microscopic structure of the present example was measured using a TEM (JEOL Ltd. JEM1230) at an accelerating voltage of 120 kV. The observed images were recorded using a Gatan CCD camera.

When the structure was observed, the sample was embedded, and after double staining with osmium tetroxide ($OsO_4$) and ruthenium tetroxide ($RuO_4$) an ultrathin section was prepared and subjected to a TEM observation.

In FIG. 6A and FIG. 6B, the matrix is bio-HDPE, (black phase) and what is being dispersed is PLLA (white domain).

Furthermore, in the structure of Example 2 processed at 600 rpm, the size of the dispersed phase is more miniaturized than in Example 1 processed at 300 rpm, and it is clear that the domain size distribution per unit area in the TEM image has a small domain of the PLLA phase being 1 µm or less is 80% or more.

In Examples 3 and 4 shown in FIG. 7A and FIG. 7B, the largest difference between Examples 1 and 2 shown in FIG. 6A and FIG. 6B is that the matrix and dispersed phase are reversed. That is, in the microscopic structure of the blend samples in this composition, PLLA forms a matrix (white phase) and bio-HDPE is the dispersed phase (black domain). Moreover, the microstructure here depends highly on the molding conditions, and in Example 3 where high-shear processing is performed at a screw rotation of 300 rpm as shown in FIG. 7A, although the dispersed phase size is large and the domain is a few µm to 10 µm, as is shown in FIG. 7B, it is clear that in Example 4 which was processed at a screw rotation of 600 rpm, the dispersed phase size becomes very small and the proportion of those with a domain size of 1 µm or less in a unit area was 50% or more.

(Tensile Properties)

A sheet of plant derived plastic blend of the Examples and Comparative Examples was punched out with a cutter into a dumbbell-shaped specimen. Testing of tensile properties was performed in accordance to the method defined in ASTM D638. The strain-stress curves were measured using an ORIENTEC tensile tester (Tensilon UTM-300). This test was performed at 23° C. in an atmosphere of 50% relative humidity and at a crosshead speed of 500 mm/min.

FIG. 8 to FIG. 15 show the stress-strain characteristics related to the present embodiment. In addition, Table 1 to 3 show modulus of elongation and stretching at break related to the present embodiment in the stress-strain characteristics shown in FIG. 8 to FIG. 15.

TABLE 1

| Samples | Modulus of elongation (MPa) | Breaking elongation (%) |
| --- | --- | --- |
| Example 1 | 974 | 80.6 |
| Example 2 | 999 | 136 |
| Example 3 | 1827 | 4.1 |
| Example 4 | 1695 | 13.6 |
| Example 5 | 1767 | 5.3 |
| Example 6 | 1820 | 14.2 |
| Comparative Example 1 | 932 | 999.7 |
| Comparative Example 2 | 2810 | 4 |

TABLE 2

| Samples | Modulus of elongation (MPa) | Breaking elongation (%) |
| --- | --- | --- |
| Example 7 | 971 | 257.7 |
| Example 8 | 994 | 703.7 |
| Example 9 | 1358 | 110.1 |
| Example 10 | 1402 | 41.4 |
| Example 11 | 1832 | 21.6 |
| Example 12 | 1864 | 27.6 |
| Comparative Example 1 | 932 | 999.7 |
| Comparative Example 2 | 2810 | 4 |

TABLE 3

| Samples | Modulus of elongation (MPa) | Breaking elongation (%) |
| --- | --- | --- |
| Example 13 | 1313 | 77.7 |
| Example 14 | 1386 | 94.7 |
| Example 15 | 1623 | 3.4 |
| Example 16 | 1583 | 13.6 |
| Example 17 | 1664 | 17.1 |
| Example 18 | 1814 | 25.0 |
| Comparative Example 1 | 932 | 999.7 |
| Comparative Example 3 | 2550 | 4 |

From FIG. 8 to FIG. 15 and the results in Tables 1 to 3, it was clear that the modulus of elongation of a plant derived HDPE having an originally low modulus (932 MPa) is improved significantly by making the content of a plant derived PLLA with respect to the plant derived HDPE 25 to 75 wt % so that the total is 100 wt % and performing a kneading process at 600 rpm using a high shear molding apparatus and adding 5 to 10 wt % of a compatibilizing agent. That is, modulus of elongation is assumed to improve microscopically dispersing plant derived HDPE and plant derived PLLA by performing high-shear molding of a plant derived plastic blend raw material and increasing the content of plant derived PLLA. Although increasing in proportion to the composition amount of the plant derived PLLA is an effect of an improvement in the modulus of elongation, if the amount of plant derived PLLA is small (25 wt %), it was clear that the modulus further increases when (PLLA-2) with a small molecular weight was used (Example 14 in Table 3).

On the other hand, although plant derived PLLA used as Comparative Example 2 and 3 only have different molecular weights and the elastic modulus is extremely high in the PLLA alone, it is a plastic with extremely poor stretching with a stretching break of 4%. In contract, the plant derived HDPE (Comparative Example 1) is a plastic with stretching of 997.7%. Therefore, as is shown in the present example, by microscopically dispersing a plant derived HDPE with respect to a plant derived PLLA, the drawback of PLLA which is only 4% stretching, in other words, breakage which occurs when stretched 4%, is significantly improved. That is, as can be seen in Examples 6, 12 and 18, it is clear that in the case of adding 25 wt % of the plant derived HDPE, stretching break occurs at 14.2%, 27.6%, and 25.0% respectively, which shows remarkable stretching. With regards to the addition amount of the compatibilizing agent EGMA, although 5 wt % is added in each example shown in Table 1 and 10 wt % in the example shown in FIG. 2, it is clear that stretching break increases significantly when 10% is added. Specifically, stretching break increased to 703.7% in Example 8 corresponding to 136% in Example 2, 41.4% in Example 10 corresponding to 13.6% in Example 4, and 27.6% in Example 12 corresponding to 14.2% in Example 6.

According to the present invention, a plant derived plastic blend in which HDPE and PLLA which are both plant derived are mixed together with improved mechanical properties is provided and a manufacturing method thereof.

As described above, according to the plant derived plastic blend and method of manufacturing the same according to the present invention, it is possible to realize a blend of plant derived plastics with dramatically improved mechanical properties by performing microscopic mixing in order to blend using a high shear molding process of a plant derived PE and plant derived PLLA. Using the present invention, it is possible to further accelerate use of plant derived plastics by creating a container or various components as a material including balanced mechanical properties which require a greater elasticity modulus than PE or greater stretching break than PLLA.

The invention claimed is:

1. A plant derived plastic blend comprising:
   10 wt % or more and 90 wt % or less of a plant derived high density polyethylene and 10 wt % or more and 90 wt % or less of a plant derived polylactic acid to achieve a total of 100 wt %; and
   further containing 1 wt % or more and 20 wt % or less of a compatibilizing agent,
   wherein a modulus of elongation of the plant derived plastic blend is 950 MPa or more and a breaking elongation of 4% or more, and
   wherein a proportion being 1 μm or less of a domain size of the plant derived polylactic acid is 60% or more in the case where the plant derived high density polyethylene is a matrix, and a proportion being 1 μm or less of a domain size of the plant derived high density polyethylene is 40% or more in the case where the plant derived polylactic acid is a matrix.

2. A container comprising the plant derived plastic blend according to claim 1.

3. A cosmetic container comprising the plant derived plastic blend according to claim 1.

4. A packaging container comprising the plant derived plastic blend according to claim 1.

5. Automotive parts comprising a plant derived plastic blend comprising:
   10 wt % or more and 90 wt % or less of a plant derived high density polyethylene and 10 wt % or more and 90 wt % or less of a plant derived polylactic acid to achieve a total of 100 wt %; and
   further containing 1 wt % or more and 20 wt % or less of a compatibilizing agent,
   wherein a modulus of elongation of the plant derived plastic blend is 950 MPa or more and a breaking elongation of 4% or more.

6. Automotive parts comprising the plant derived plastic blend according to claim 1.

* * * * *